United States Patent [19]

Sinnema

[11] 4,187,268

[45] Feb. 5, 1980

[54] METHOD OF MANUFACTURING MOLDED ARTICLES FROM A KNEADABLE MATERIAL, E.G., CLAY

[75] Inventor: Hendrik Sinnema, Sneek, Netherlands

[73] Assignee: Machinefabriek W. Hubert & Co. B.V., Sneek, Netherlands

[21] Appl. No.: 541,035

[22] Filed: Jan. 14, 1975

[51] Int. Cl.$^2$ .............................................. B29C 17/14

[52] U.S. Cl. .................................... 264/151; 264/148; 264/294

[58] Field of Search ............... 264/138, 145, 148, 157, 264/299, 309, 320; 83/340, 342; 425/286, 296, 307, 371

[56] References Cited

U.S. PATENT DOCUMENTS

| | | | |
|---|---|---|---|
| 1,578,409 | 3/1926 | Duty | 425/106 |
| 1,825,969 | 10/1931 | McClintock | 425/106 |
| 1,909,029 | 5/1933 | Walter | 83/340 |
| 2,305,312 | 12/1942 | Kern | 83/342 |
| 2,389,163 | 11/1945 | Miller et al. | 264/138 |
| 2,553,690 | 5/1951 | Walsh | 264/131 |
| 2,829,689 | 4/1958 | Jarvis | 83/342 |
| 3,983,207 | 9/1976 | Sinnema | 264/309 |

OTHER PUBLICATIONS

Singer et al., *Industrial Ceramics*, p. 717 (1963).

*Primary Examiner*—Robert F. White
*Assistant Examiner*—John A. Parrish
*Attorney, Agent, or Firm*—Alan H. Levine

[57] ABSTRACT

Process by which moulded articles are maufactured from clay. A continuously produced strand of the material in question is sprinkled with sand, whereafter at one location a piece is severed from the end of the strand at regular intervals, by a cutting apparatus, which piece then enters a mould. In the course of all phases of the process the strand and each severed piece thereof remain directed along one vertical downwardly directed line of movement.

5 Claims, 3 Drawing Figures

METHOD OF MANUFACTURING MOLDED ARTICLES FROM A KNEADABLE MATERIAL, E.G., CLAY

BACKGROUND OF THE INVENTION

My invention relates to a process for manufacturing moulded articles from kneadable or plastic materials, e.g. clay, for sprinkling a continuously produced strand of the material in question with a granular material e.g. sand, whereupon at the end of the advancing strand at one location at regular intervals a piece is severed therefrom and such a velocity is imparted to the severed piece that, when the latter enters a mould which is put in readiness, as a consequence of the kinetic energy accumulated in said severed piece, it automatically fully fills the mould.

SUMMARY OF THE INVENTION

My invention aims to provide an improvement of this process, known per se, which is achieved by the arrangement that in the course of all phases of the process the strand and each severed piece thereof are directed or remain directed along only one vertical or at least practically vertical line of movement. The effect of this improvement is that the complete apparatus required for performing said process occupies less floor space while the operation reliability increases. In order to avoid a deviation from the direction of movement on severing a piece from the end of the strand, each periodical cutting of the continuously produced advancing strand of kneadable material is effected from two lateral faces of the strand, which are symmetrically situated relative to the direction of movement. This simultaneous cutting is preferably effected from two lateral faces of the strand along circular segmental paths which contact or intersect each other in the strand. Consequently the severed piece of the strand is prevented from tilting owing to the action of the cutters which would, as a matter of fact, occur should the cutting be effected from one side only. When circular segmental paths are applied the severed piece is formed with an arrow-shaped profile, which also assists in keeping the piece in the vertical direction of movement.

The cutting apparatus is provided with two shafts which are rotatably supported on either side of the advancing strand and provided with driving means for rotation, at least one cutter being mounted on each shaft, in a direction parallel to the shaft, the driving means being constructed and arranged such that the shafts rotate in opposite directions with an equal circumferential velocity, a cutter on either side of the continuously advancing strand penetrating periodically at the same time into the strand. On each shaft an equal number of cutters are likewise arranged in the same way about said shaft, the cutters preferably consisting of cutting wires.

DESCRIPTION OF PREFERRED EMBODIMENTS

Figure 1:
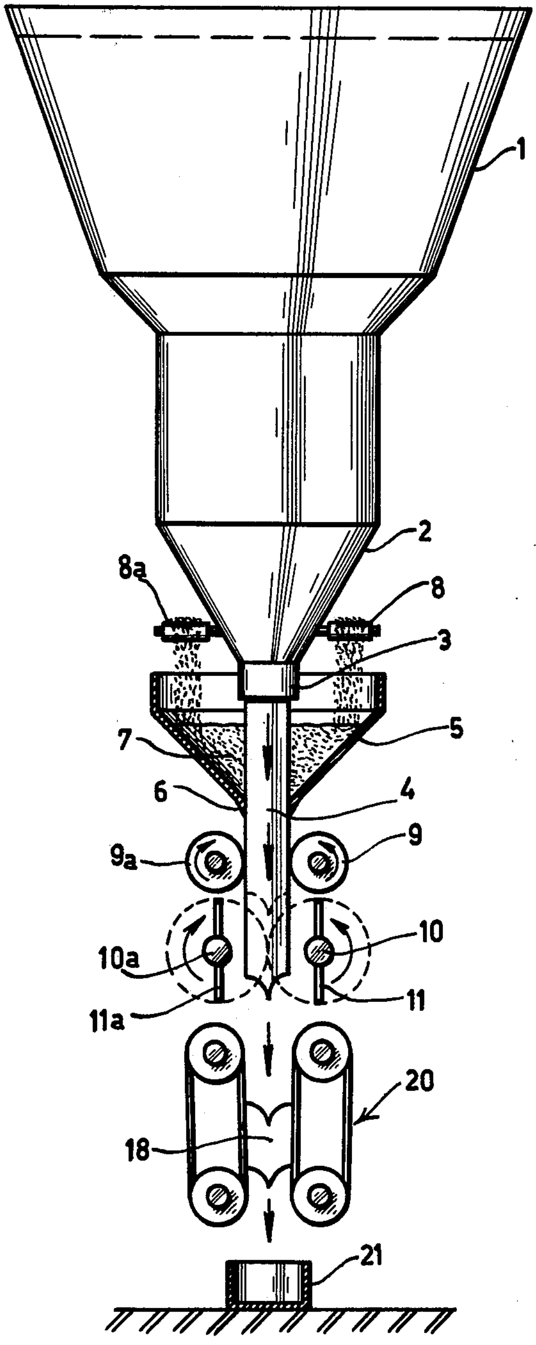
FIG. 1 represents diagrammatically a view of the apparatus for manufacturing the moulded articles.

The apparatus for manufacturing the moulded articles from a kneadable material e.g. clay, consists of a container 1, with a hopper-shaped end piece 2 ending in an outlet 3. By means of members (not shown) the kneadable mass is continuously pressed through the outlet 3 so as to issue therefrom as a vertically advancing strand 4 of kneadable material. Around the outlet 3, is disposed a sanding box 5, with an opening 6, situated vertically under the outlet 3, the cross section of said opening 6 corresponding to the cross section of the extruded strand 4. The sanding box 5 is regularly filled up with a quantity of sand 7 which is supplied via endless belts 8 and 8a from a container (not shown). Vertically spaced down from the passage 6 are two pairs of presser rollers, of which one pair of rollers 9 and 9a is visible in FIG. 1. Each presser roller is applied to a corresponding lateral face of the strand 4.

By means of driving members (not shown) the presser rollers 9 and 9a of each pair of rollers are rotated in opposite directions, consequently the sand applied to the strand 4 is pressed into the same.

Figure 2:
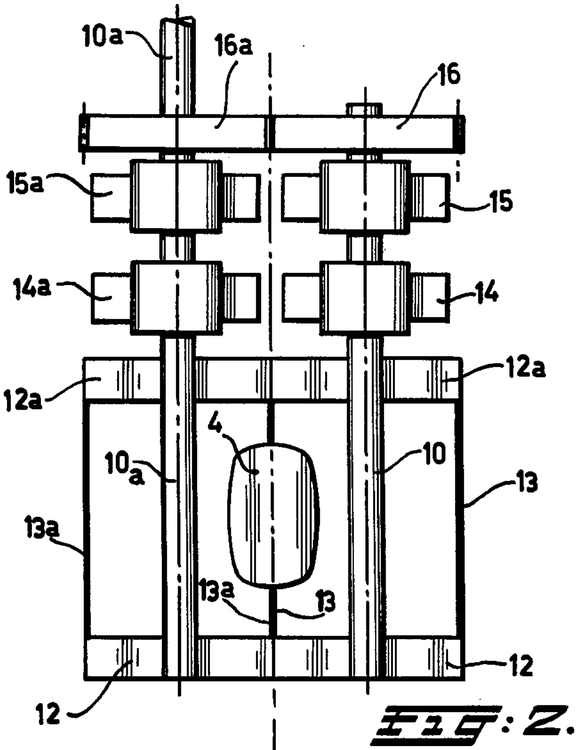
FIG. 2 shows on a larger scale a plan view of the cutting apparatus.

Mounted vertically under the pairs of presser rollers 9 and 9a is a cutting apparatus consisting of two cutters 11 and 11a mounted on either side of the advancing strand 4 on corresponding rotatably supported shafts 10 and 10a. Each cutter 11 or 11a consists of two arms 12 and 12a which in spaced relationship from each other are secured on the shaft of the cutter and which are situated in the same plane parallel to each other. Each arm extends perpendicular to the shaft on either side thereof and equally far (see also FIG. 2). A cutting wire 13 or 13a is mounted between the ends of a pair of arms 12 or 12a situated on one side of the shaft.

The shafts 10 and 10a which are unilaterally supported in a double pair of bearings 14 and 15, 14a and 15a, respectively, are rotated in opposite directions at the same speed. The driving gear therefor consists of gear wheels 16 and 16a, secured on the respective shafts 10 and 10a, which are in mesh, while the shaft 10a is coupled to a driving motor (not shown).

Figure 3:
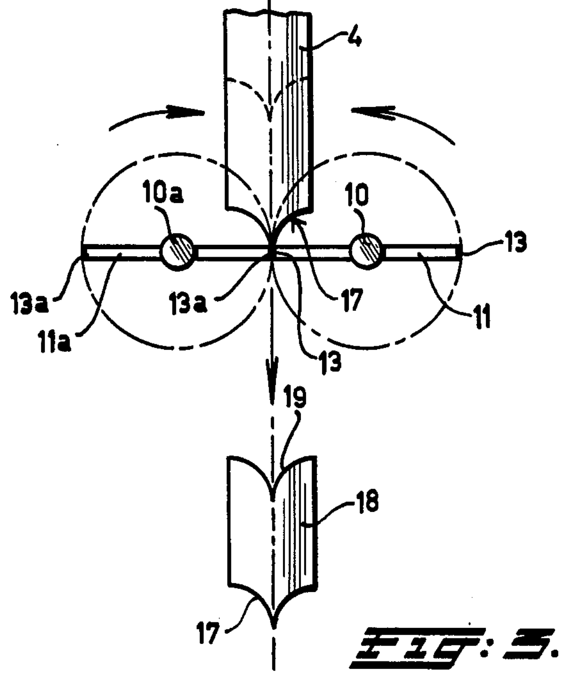
FIG. 3 shows diagrammatically a front view of the cutting apparatus, part of the advancing strand entering the cutting apparatus, and part of a severed piece after leaving the cutting apparatus.

The dimensions and the adjustment of the cutting members 11 and 11a are such relative to each other that on either side of the continuously advancing strand 4 cutting wires periodically penetrate simultaneously into the strand 4 cutting from two sides through this strand along circular segmental paths, touching each other in the strand. In connection with the fact that the strand 4 keeps moving during the cutting operation, finally a more or less arrow-shaped face of severance 17 is formed (see FIG. 3). Obviously the severed piece 18 of the strand 4 has at its front end the shape of an arrow, while the other end has an indentation 19 the profile of which corresponds to that of the shape of the arrow.

Vertically under the cutting apparatus and spaced therefrom is disposed a guiding device 20 by which means the piece 18, severed from the strand 4 is thrown into the mould 21 at a particular rate.

Various modifications are possible within the scope of the invention, particularly as to the number and the shape of the cutting members to be disposed in the cutting apparatus.

What I claim is:

1. A method of making molded articles comprising the steps of:

(a) continuously producing a vertical strand of plastic material, the strand moving continuously along a vertical path, (b) severing the moving strand at regular intervals to produce a succession of individual pieces of plastic material, (c) delivering each individual piece to a guide means arranged along said vertical path, and (d) operating the guide means to throw each individual piece along said vertical path into a mold with sufficient kinetic energy that the piece plastically deforms and fills the mold.

2. A method as defined in claim 1 including the step of applying sand to the exterior surface of the moving strand prior to severing the strand.

3. A method as defined in claim 2 including the step of pressing the sand into the strand prior to severing the strand.

4. A method as defined in claim 1 wherein severing the strand comprises cutting into the strand along two lines of severance which extend from opposite sides of the strand and meet in the middle of the strand.

5. A method as defined in claim 4 wherein each of the lines of severance has a circular segmental shape which causes the lower end of each individual piece to have an arrowhead-like configuration.

* * * * *